United States Patent

[11] 3,588,471

[72] Inventor William W. Chambers
Anaheim, Calif.
[21] Appl. No. 805,988
[22] Filed Feb. 25, 1969
[45] Patented June 28, 1971
[73] Assignee Robertshaw Controls Company
Richmond, Va.
Continuation-in-part of application Ser. No. 763,668, Sept. 30, 1968.

[54] SEQUENTIAL LOADING TEMPERATURE CONTROL SYSTEM
11 Claims, 1 Drawing Fig.

[52] U.S. Cl. .................................................. 219/486
[51] Int. Cl. .................................................. H05b 1/02
[50] Field of Search ........................................ 219/508, 486; 332/95, 335, 320

[56] References Cited
UNITED STATES PATENTS
3,046,380  7/1962  Carlson .................. 219/486
3,351,739  11/1967  Eckman .................. 219/486

Primary Examiner—Bernard A. Gilheany
Assistant Examiner—F. E. Bell
Attorneys—Auzville Jackson, Jr, Robert L. Marben and Fulwider, Patton, Rieber, Lee and Utecht ABSTRACT: A temperature control system including first and second heating elements having respective first and second switches in series therewith, such switches including thermostatic blades which are responsive to predetermined temperatures for closing said respective switches. Circuit means is provided for sequentially heating the first and second thermostatic blades to sequentially energize said first and second heating elements whereby when power is applied to said system the first thermostatic blade will be heated to, after a selected time, close the first switch thereby energizing the first heat element. The second thermostatic blade will then be heated to close the second switch and energize the second heating element.

The system may also include a time delay relay for delaying heating of the first thermostatic blade for a selected period of time after power has been applied to the system whereby individual temperature control systems within a community may be energized at different times to avoid simultaneous start-up of all control systems within the community when power has been applied thereto thus preventing overloading of the power source when, for example, power has been temporarily interrupted.

A pickup may also be provided in inductive relationship with the leads from the first and second heating elements for energizing a fan which forces air over such elements whenever current is flowing in either one of the leads whereby the fan will be started when the first element is energized and will remain operative until both the first and second switches are opened.

PATENTED JUN28 1971  3,588,471

INVENTOR.
WILLIAM W. CHAMBERS
ATTORNEYS

SEQUENTIAL LOADING TEMPERATURE CONTROL SYSTEM

This application is a continuation-in-part of my application Ser. No. 763,668.

BACKGROUND OF THE INVENTION

1. Field of the Invention

The present invention relates generally to temperature control systems and more particularly to a control system which, upon application of power, energizes a plurality of heating elements sequentially to thereby avoid overloading the power source.

2. Description of Prior Art

Temperature control systems have been proposed which include a plurality of heating elements that are sequentially energized upon application of power but such control systems are generally of rather complex construction and include numerous mechanical components such as levers, springs, and control rods. There are no temperature control systems known to applicant which include a plurality of stages having heating elements in series with switches including multimetallic thermostatic blades and means actuated upon energization of each stage to initiate heating of the switch blade in the subsequent stage to effect staggered energization of such heating elements.

SUMMARY OF THE INVENTION

The present invention is characterized by a plurality of heating elements, each being connected in series with a control switch having a multimetallic blade. Also in series with each of the heating elements is means for heating the multimetallic blade of the subsequent heating element whereby energization of the system will result in sequential closing of the switches to progressively bring the heating elements into circuit.

Other objects and features of the invention will become apparent from consideration of the following description taken in conjunction with the accompanying drawing.

DESCRIPTION OF THE PREFERRED EMBODIMENT

Figure 1:
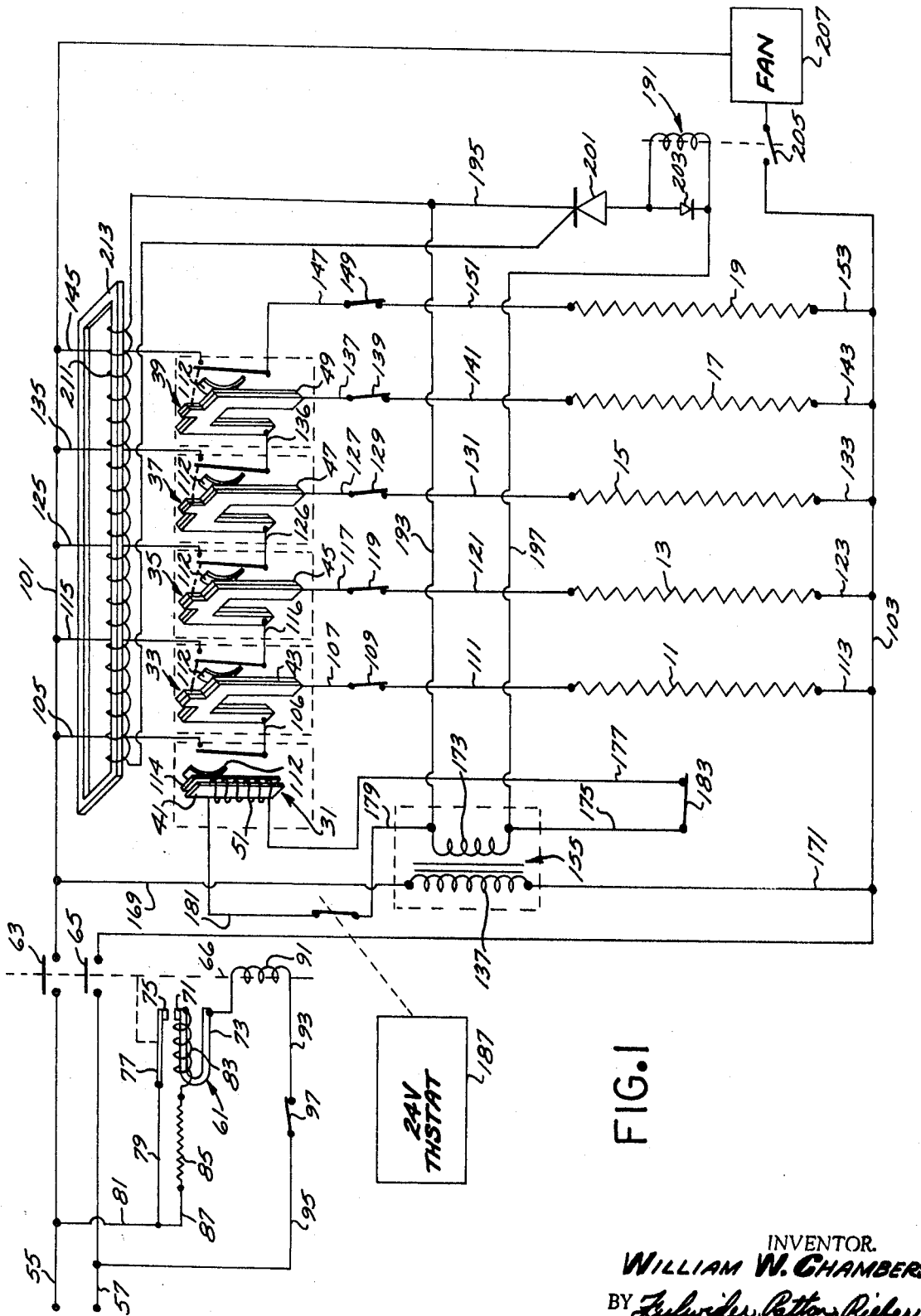
FIG. 1 is a diagrammatic view of a temperature control system embodying the present invention.

The temperature control system of the present invention is particularly adapted for controlling operation of a forced air heater, and includes a plurality of heating stages comprising heating elements 11, 13, 15, 17, and 19 controlled by switches, generally designated 31, 33, 35, 37, and 39, respectively. The switches are connected in series with their associated heating elements and include, respectively, multimetallic, electrically conductive, thermostatic blades 41, 43, 45, 47, and 49. The first stage blade 41 is wound with a coil of resistance wire 51 for heating such blade when power is supplied to the system. Such heating causes blade flexure which is effective to close the switch 31 and provide current through the heating element 11. Current through the first stage element 11 will also pass through the second stage thermostatic blade 43 thereby heating it and closing the switch 33 to energize the second stage heating element 13. The remaining switches 35, 37, and 39 will likewise be sequentially closed to energize the heating elements 15, 17, and 19, respectively.

Power to the heating elements 11, 13, 15, 17, and 19 is supplied from a power source (not shown) through a pair of power leads 55 and 57, respectively, having a time delay relay, generally designated 61 therein. The time delay relay 61 is more fully described in my copending application filed Sept. 30, 1968 and bearing Ser. No. 763,668. While such relay 61 has proved particularly satisfactory, it is not considered necessary to the operation of the control system of present invention.

The relay 61 includes a pair of switches 63 and 65, coupled with the armature 66, for controlling current flow in the power leads 55 and 57, respectively. A first contact 71 is carried on the free end of a U-shaped, electrically conductive, bimetallic blade 73 having its lower leg mounted on the body (not shown) of such relay. A second contact 75 is disposed in engageable alignment with the first contact 71 and is carried from the free end of an electrically conductive leaf spring 77 cantileverally mounted on the frame of the relay 61 and having its free end coupled with the armature of the relay 61. The leaf spring 77 is connected with the source lead 55 by means of leads 79 and 81, and a heat motor, in the form of a resistance coil 83 wrapped on the upper leg of the bimetallic blade 73, is connected in parallel therewith by means of a resistor 85 and a lead 87. A relay coil 91 is connected in series with the thermostatic blade 73, and with the power lead 57 through a pair of leads 93 and 95 which are in series with a limit switch 97.

The heating elements 11, 13, 15, 17, and 19 are connected in parallel between leads 101 and 103, respectively, to which the current is controlled by the relay switches 63 and 65. The first stage heating element 11 is connected between the leads 101 and 103 by means of lead 105, switch 31, lead 106, U-shaped thermostatic blade 43, lead 107, a limit switch 109, and leads 111 and 113.

A bimetallic bucking strip 114 is mounted coextensive with the first stage thermostatic blade 41. The bucking strip 114 possesses substantially the same thermal expansive characteristics as the blade 41 but is opposed thereto to flex upon heating and tend to urge the blade 41 toward its open position. Thus the heat motor, being wound on the blade 41, will heat it more rapidly than the strip 114 to cause the switch 41 to close but after a period of time the temperature of the strip 114 will approach the temperature of the blade 41 to urge such blade toward its open position and effect rapid opening of the switch 31 when current to the motor 51 ceases. Also, the bucking strip 114 is heated uniformly with the blade 41 to compensate for local heating not caused by the motor 51 thereby preventing false switch closing. The blade 41 is also biased toward open position by an over-the-center type spring 112 for exerting a predetermined bias against closing of the blade 41. This requires that a predetermined force be developed in the blade 41 as a result of thermal stresses to overcome the bias of the spring 112. When the spring bias is exceeded, the spring snaps to a relieved position which quickly releases the blade 41 to allow it to rapidly close the switch 31.

The second stage heating element 13 is connected between the wires 101 and 103 by means of a lead 115, switch 33, lead 116, thermostatic blade 45, lead 117, limit switch 119, and leads 121 and 123. All the control switches 33, 35, 37, and 39 are snap acting by means of over-the-center type springs 112, similar to that already described in connection with the switch 31.

In a similar manner, the third stage heating element 15 is connected between the leads 101 and 103 by means of a lead 125, switch 31, lead 126, thermostatic blade 47, lead 127, limit switch 129, and leads 131 and 133.

The fourth stage heating element 17 is connected between the leads 101 and 103 by means of lead 135, switch 37, lead 136, U-shaped blade 49, lead 137, limit switch 139, and leads 141 and 143.

The fifth stage heating element 19 is connected between the leads 101 and 103 by a lead 145, switch 39, lead 147, limit switch 149, and leads 151 and 153.

A transformer, generally designated 155, has its primary coil 157 connected between the leads 101 and 103 by means of leads 169 and 171. The secondary coil 173 of the transformer 155 is connected across the heat motor 51 by means of leads 175, 177, 179, and 181, a limit switch 183 being included between the leads 175 and 177 and a thermostat 187 being included between the leads 179 and 181.

A fan control relay, generally designated 191, has its winding connected across the secondary coil 173 by means of leads 193, 195 and 197. A silicone controlled rectifier (SCR) 201 controls current flow in the relay 191, and a diode 203 is connected across the windings of the relay 191 to provide a flow path for current induced by collapse of the magnetic field in said windings during negative going half cycles. The switch 205 of the relay 191 is connected with the lead 103 and also to one terminal of a blower fan 207, the other terminal of such fan being connected with the power lead 101.

A capacitor 209 is connected between the leads 193 and 197 to absorb current surges from the transformer secondary coil 173 when the circuit to the first stage switch 31 is completed by the thermostat 187 to prevent momentary closing of the relay 191 and consequent arcing and burning of the relay contacts.

The gate of the SCR 201 is connected with a coil 211 wound on a ferromagnetic core formed by a loop 213 which encircles the leads 105, 115, 125, 135 and 145 leading to the control switches 33, 35, 37 and 39, respectively. With this arrangement a triggering signal is imposed on the gate of such SCR whenever any one such switch is closed.

In operation, current from the power lead 55 passes through leads 81 and 87, and resistor 85, to the heat motor 83 of the time delay relay 61, through the relay winding 91, and back to the power lead 57 through leads 93 and 95. The resistance of the resistor 85 and heat motor 83 is sufficiently great to maintain the current level through the relay winding 91 low enough to prevent closing of the relay 61. However, after a certain length of time the heat motor 83 will heat and flex the thermostatic blade 73 sufficiently to raise the first contact 71 into contact with the second contact 75 carried on the leaf spring 77. Such engagement of the contacts 71 and 75 will provide current flow through the lead 79, thermostatic blade 73 and winding 91 to actuate the relay 61, thereby pulling the armature 66 downwardly and closing the switches 63 and 65 in the power leads 55 and 57 to provide current to the transformer 155. Closing of the relay 61 also enables the free end of the leaf spring 77 to move downwardly to maintain the contacts 71 and 75 in engagement when the thermostatic blade 73 subsequently cools and relaxes.

It will be recalled that the leaf spring 77 and heat motor 83 are in parallel and consequently the current will follow a path through the lead 79 and leaf spring 77 and through the relay 91 thereby enabling the heat motor 83 to cool, thus returning the thermostatic blade 73 to its relaxed position whereby deenergization of the relay 61 will rapidly break contact between the contacts 71 and 75. The temperature control system of present invention is adaptable for utilization in water heaters and in such applications, a conventional relay, similar to the relay 97, is frequently utilized to prevent overheating. When the system is so employed, rapid opening of the relay 61 is of particular importance when the limit switch 97 opens to avoid further steam buildup in the heater and overpressurization. Also, the relay 61 must open rapidly to disconnect the system from the power source and provide a delay in start up when power has been only momentarily interrupted, as when a tree limb brushes against a power line.

When the environment in which the temperature is being controlled cools sufficiently, the thermostat 187 will close to provide current from the secondary windings 173 to the heat motor 51 encircling the first stage thermostat blade 41. Closing of the thermostat 187 completes a circuit across the transformer secondary coil 173 resulting in a current surge. The capacitor 209 serves to absorb the current surge to prevent application thereof to the anode and cathode of the SCR 201 thereby preventing premature triggering thereof and consequent momentary closure of the relay 191. Heating of the thermostatic blade 41 will cause such blade to overcome the force of the bias spring 112 to snap the switch 31 closed thereby providing current flow through the first stage heating element 11 and through the series connected thermostatic blade 43 of the second stage control switch 33. Since the heat motor 51 is wrapped on the thermostatic blade 41, such blade will be heated more rapidly than the bucking strip 114 to cause the stresses therein to build up more rapidly than in the strip 114 to close the switch 31.

Current flow through the lead 105 to the first stage switch 31 induces a magnetic field in the electromagnetic loop 213 to induce current flow in the winding 211, thus providing a triggering current at the gate of the SCR 201. Triggering of the SCR 201 enables current flow from the secondary winding 173 through the relay winding 191 to close the fan switch 205 and actuate the fan 207 to circulate air over the heating elements 11, 13, 15, 17 and 19. This arrangement is of particular importance since the fan 207 is necessarily energized when the first heating element 11 is energized to prevent overheating thereof.

A certain period of time after closing of the first stage switch 31 the second stage thermostatic blade 43 will be heated by current flow therethrough and flexed sufficiently to snap the second stage switch 33 closed and provide current flow through the second stage heating element 13 and also through the third stage control switch thermostatic blade 47. Again, current flow through the thermostatic blade 47 will cause it to act as a heat motor thereby heating itself sufficiently to close the third stage control switch 37, energize the third stage heating element 17 and initiate current flow in the thermostatic blade 49. The fourth stage switch 39 will then be closed to energize the fourth stage heating element 19.

When the environment is heated to the target temperature causing the thermostat 187 to open, current flow through the first stage control switch heat motor 51 will be discontinued thereby enabling the thermostatic blade 41 to cool.

When the thermostatic blade 41 has cooled a relatively small amount, thus relaxing some of its thermal stresses, the stresses in the bucking strip 114 will snap the switch 31 to its open position. Opening of the switch 31 discontinues current to the first stage heating element 11 and also enables the second stage thermostatic blade 43 to cool, thus opening the second stage switch 33 and deenergizing the second stage heating element 13. This procedure continues for the remainder of the control switches 35, 37, 39, and the corresponding heating elements 15, 17, and 19. The fan 207 will remain operative until current flow in the lead 145 to the switch 39 of the last stage is discontinued thereby discontinuing induction of current in the loop 213 and, consequently, in the winding 211 supplying the triggering signal to the SCR 201.

Under certain conditions, such as rapid fluctuation in environmental temperature, rapid cycling of the heating elements 11, 13, 15, and 17 may be experienced. In certain instances this could result in the first and last stage switches 31 and 39 being open, for example, and one or more of the intermediate switches 33, 35, or 37 being closed. However, until the current flow is discontinued in all the leads 105, 115, 125, 135, and 145, the fan 207 will remain operative and thereby prevent overheating of those elements that are energized.

When power to the temperature control system is lost, the winding 91 in the normally open delay relay 61 will be deenergized thereby enabling the armature 66 to move upwardly to open the switches 63 and 65 whereby, when power is restored, the system will not be immediately applied as a load on the power source. Opening of the relay 61 moves the free end of the leaf spring 77 upwardly to space the first and second contacts 71, 75 apart in readiness for reapplication of power. When power is again applied to the control system, the heat motor 83 of the relay 61 will again be heated to effect closing of the relay and the above-described procedure will be repeated.

It will be clear that local heating of the first stage switch 31, other than by the heat motor 51, will heat both the thermostatic blade 41 and the bucking strip 114 thereby cancelling out the thermal stresses in the blade 41 to prevent closure.

From the foregoing description, it will be apparent that the sequential loading temperature control system of the present invention provides a convenient means for sequentially bringing a plurality of heating elements into circuit upon application of power and thereby preventing overloading of the power source. The fan is rendered operative when the first heating element is energized and continues to operate until the last heating element has been deenergized. Further, the control system includes a delay relay which is rapidly opened upon loss of power and provides a time delay for reenergization of the first stage upon reapplication of power whereby different systems within the community may have different time delays to avoid instantaneous actuation of all systems within the community.

Various modifications and changes may be made with regard to the foregoing detailed description without departing from the spirit of the invention or the scope of the following claims.

I claim:
1. A sequential loading temperature control system, comprising:
   a power source;
   first and second heating elements connected with said power source;
   first and second switches connected in series with said respective first and second heating elements;
   first and second thermostatic blades drivingly coupled with the respective first and second switches and responsive to a predetermined temperature to close said respective switches;
   first and second circuit means for providing current to heat said respective first and second blades, said second circuit means being connected in series with said first switch whereby when said system is energized said first circuit means will be energized to heat said first thermostatic blade to close said first switch to energize both said first heating element and said second circuit means to commence heating of said second thermostatic blade and after a time lapse, said second thermostatic blade will reach said predetermined temperature to close said second switch and energize said second heating element to thereby provide a first time lapse between energization of said system and closing of said first switch and a second time lapse between closing of said first switch and closing of said second switch.

2. A sequential loading temperature control system as set forth in claim 1 that includes:
   fan means for blowing air in heat exchange relationship with said heating elements;
   fan switch means in electrical circuit with said fan and said power source;
   sensing means responsive to current flow through either said first and second switches to close said fan switch means whereby said fan is energized when said first switch is closed and remains energized until both said first and second switches are opened.

3. A sequential loading temperature control system as set forth in claim 1 that includes:
   a delay relay in circuit between said power source and said first heating element and including a delay switch in series with the winding of said relay, said delay switch including a first contact carried by a thermally expansive element, a second contact normally spaced from said first contact, and in engageable alignment therewith a heat motor connected with said power source and disposed in heat exchange relationship with said expansive element whereby when said source applies power to said heat motor, said expansive element will be heated to, after a time lapse, engage said first and second contacts to energize said winding and close said relay.

4. A sequential loading temperature control system as set forth in claim 1 wherein:
   said second thermostatic blade is electrically conductive and said circuit means applies said current to said second blade whereby said second blade becomes self-heating to effect closure of said second switch.

5. A sequential loading temperature control system as set forth in claim 1 wherein:
   said first switch includes a thermostatic bucking strip arranged in opposed relation with said first thermostatic blade and having substantially the same thermal deflection characteristics as said first thermostatic blade whereby when both said first thermostatic blade and said strip are heated at the same rate said bucking strip will resist flexure of said first thermostatic blade.

6. A sequential loading temperature control system as set forth in claim 1 wherein:
   said first switch includes a thermostatic bucking strip disposed adjacent said first thermostatic blade in heat exchange relationship therewith and having substantially the same thermal deflection characteristics as said first thermostatic blade whereby heating of said first thermostatic blade effects heating of said bucking strip thereby to rapidly urge said first thermostatic blade toward its open position upon discontinuance of said heating of said first blade.

7. A sequential loading temperature control system as set forth in claim 1 wherein:
   at least one of said switches includes means resisting initial closing movement of the associated said thermostatic blade and operative upon development of a predetermined amount of thermal stresses in said associated blade to suddenly release said associated blade for closure of said one of said switches.

8. A sequential loading temperature control system as set forth in claim 2 wherein:
   said fan switch means includes a silicon controlled rectifier having its gate connected to said sensing means.

9. A sequential loading temperature control system as set forth in claim 3 wherein:
   said second contact is coupled with the armature of said relay for engagement with said first contact upon energization of said relay, said heat motor and second contact being connected in parallel, and said relay includes resistance means in series with said heat motor for reducing current flow through said heat motor when said delay switch is closed whereby when power is applied to said heat motor said thermally expansive element will flex to close said first and second contacts and thereby close said relay, thereby maintaining engagement of said first and second contacts and enabling rapid disengagement thereof upon cooling of said heat motor and subsequent deenergization of said relay.

10. A sequential loading temperature control system as set forth in claim 9 wherein:
    said delay relay includes an electrically conductive leaf spring cantileverally mounted from the frame of said relay and formed to bias said first and second contacts into engagement, the armature of said relay being operative when said relay is deenergized to overcome the bias of said leaf spring to space said first and second contacts apart.

11. A sequential loading temperature control system as set forth in claim 2 wherein:
    said fan switch means is responsive to current surges; and
    said system includes capacitance means connected across said power source for absorbing current surges to prevent false switching of said fan switch means.